(12) United States Patent
Hsieh et al.

(10) Patent No.: US 8,066,441 B2
(45) Date of Patent: Nov. 29, 2011

(54) ADJUSTABLE CONNECTING MECHANISM FOR CAMERA DEVICE

(75) Inventors: Ming-Chih Hsieh, Taipei Hsien (TW); Tsung-Hsi Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/822,277

(22) Filed: Jun. 24, 2010

(65) Prior Publication Data

US 2011/0236010 A1 Sep. 29, 2011

(30) Foreign Application Priority Data

Mar. 29, 2010 (TW) .............................. 99109457 A

(51) Int. Cl.
*G03B 17/00* (2006.01)

(52) U.S. Cl. ........................................ 396/530; 359/823

(58) Field of Classification Search ................... 396/530; 359/823

See application file for complete search history.

(56) References Cited

U.S. PATENT DOCUMENTS

| | | | |
|---|---|---|---|
| 2002/0141081 A1* | 10/2002 | Onda | 359/823 |
| 2006/0007567 A1* | 1/2006 | Sakamoto et al. | 359/822 |
| 2007/0091462 A1* | 4/2007 | Sasaki | 359/694 |
| 2009/0091850 A1* | 4/2009 | Yumiki et al. | 359/817 |

* cited by examiner

*Primary Examiner* — W. B. Perkey
*Assistant Examiner* — Fang-Chi Chang
(74) *Attorney, Agent, or Firm* — Altis Law Group, Inc.

(57) ABSTRACT

An adjustable connecting mechanism for a camera device includes a frame, a tubular fixing member and a locking screw The frame forms a mounting portion; the mounting portion defines a through hole. The fixing member defines a first engaging portion and a second engaging portion spaced a predetermined distance from the first engaging portion along an axis of the fixing member. The locking screw is able to pass through the through hole and selectively engage in the first engaging portion or the second engaging portion, to adjust a height of the fixing member relative to the frame.

13 Claims, 4 Drawing Sheets

ADJUSTABLE CONNECTING MECHANISM FOR CAMERA DEVICE

BACKGROUND

Technical Field

The present disclosure relates to adjustable connecting mechanisms and, particularly, to an adjustable connecting mechanism for a camera device.

There are two types of camera modules defined by different imaging distance: the first camera module having an imaging distance of 12.5 mm and the second camera module having an imaging distance of 17.5 mm. Accordingly, there are two types of camera mount types: CS-type for the first camera module and C-type mount for the second camera module. CS-type mount threadedly mounts the first camera module directly on a mounting portion of the camera device. A common used camera device usually includes an adjusting ring with a height of 5 mm. If the second camera module is needed, a user may disassemble the first camera module and sleeve the adjusting ring on the mounting portion, and then threadedly mount the second camera module on the mounting portion, until the second camera module abuts the adjusting ring. The second camera module is raised 5 mm, and the second camera module is capable of imaging at a film in the body of camera device.

However, the adjusting ring has a small shape, often detaches from the camera device, and can be easily lost.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
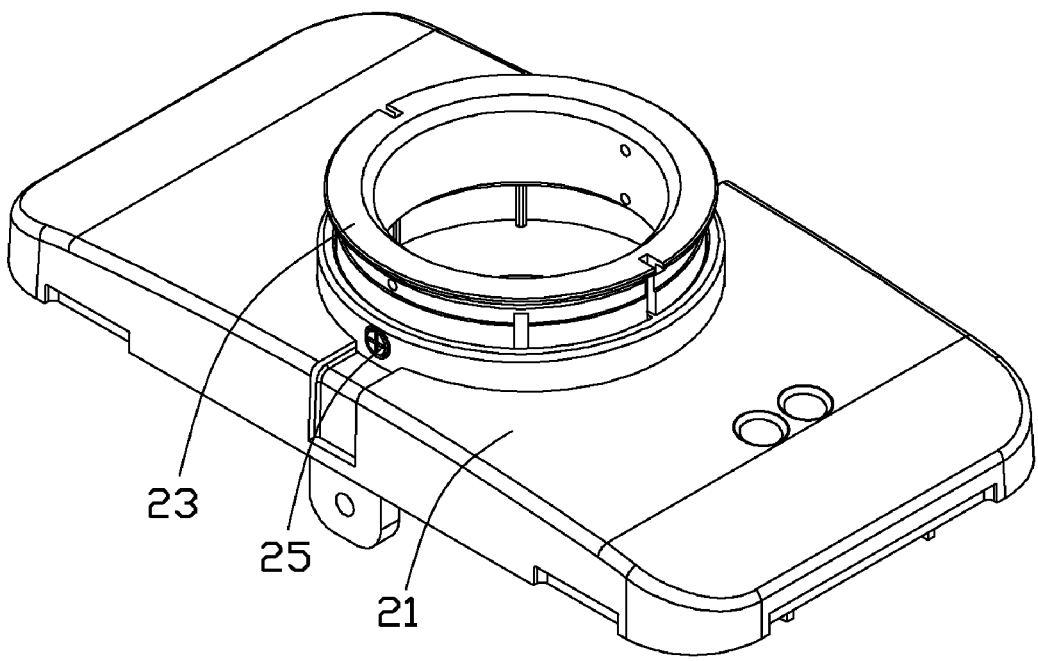
FIG. 1 is an isometric view of an exemplary embodiment of a adjustable connecting mechanism for a camera device in a state of C-type mount.
Figure 2:
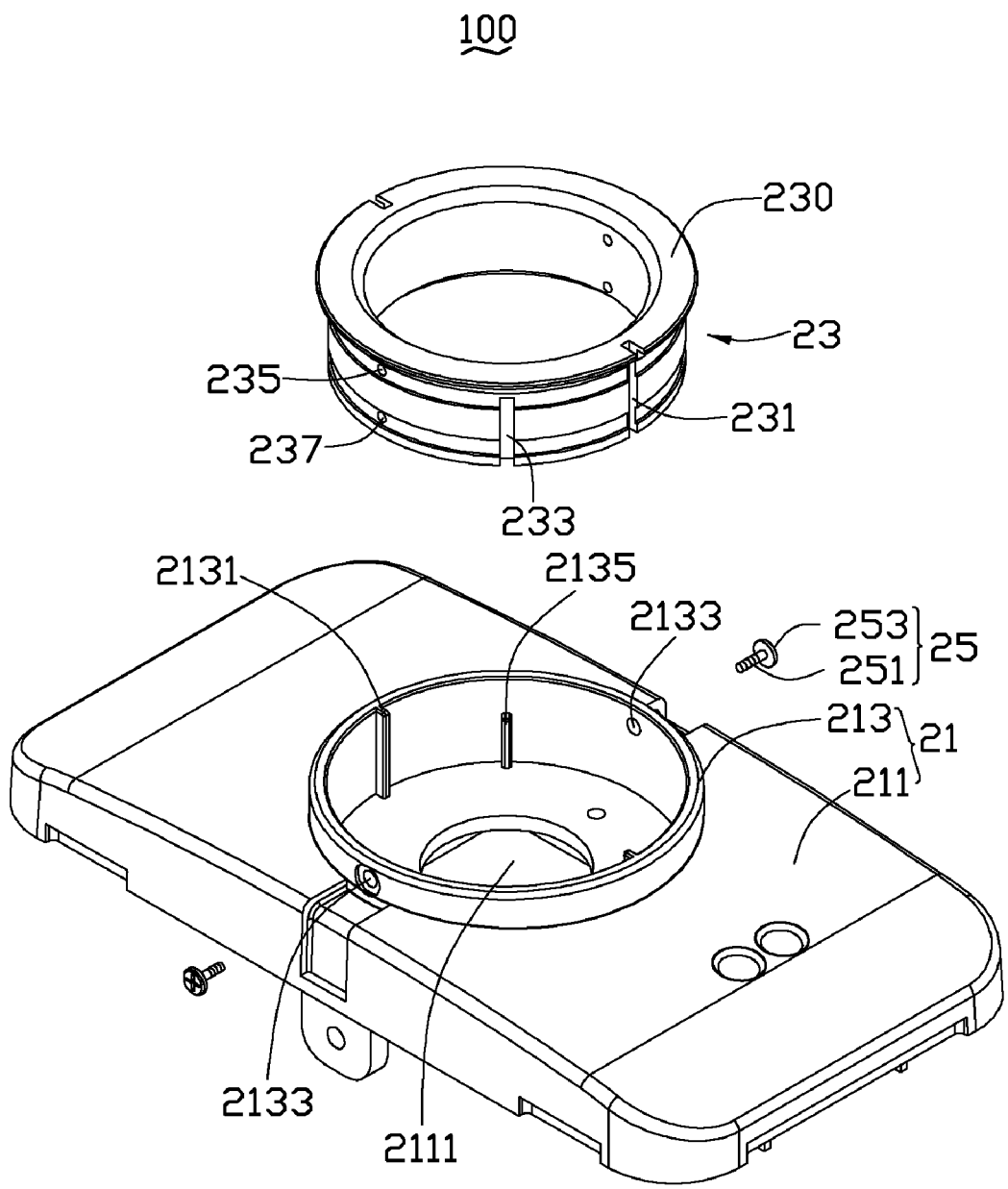
FIG. 2 is an exploded, isometric view of the adjustable connecting mechanism of FIG. 1; the adjustable connecting mechanism including a frame and a fixing member.
Figure 3:
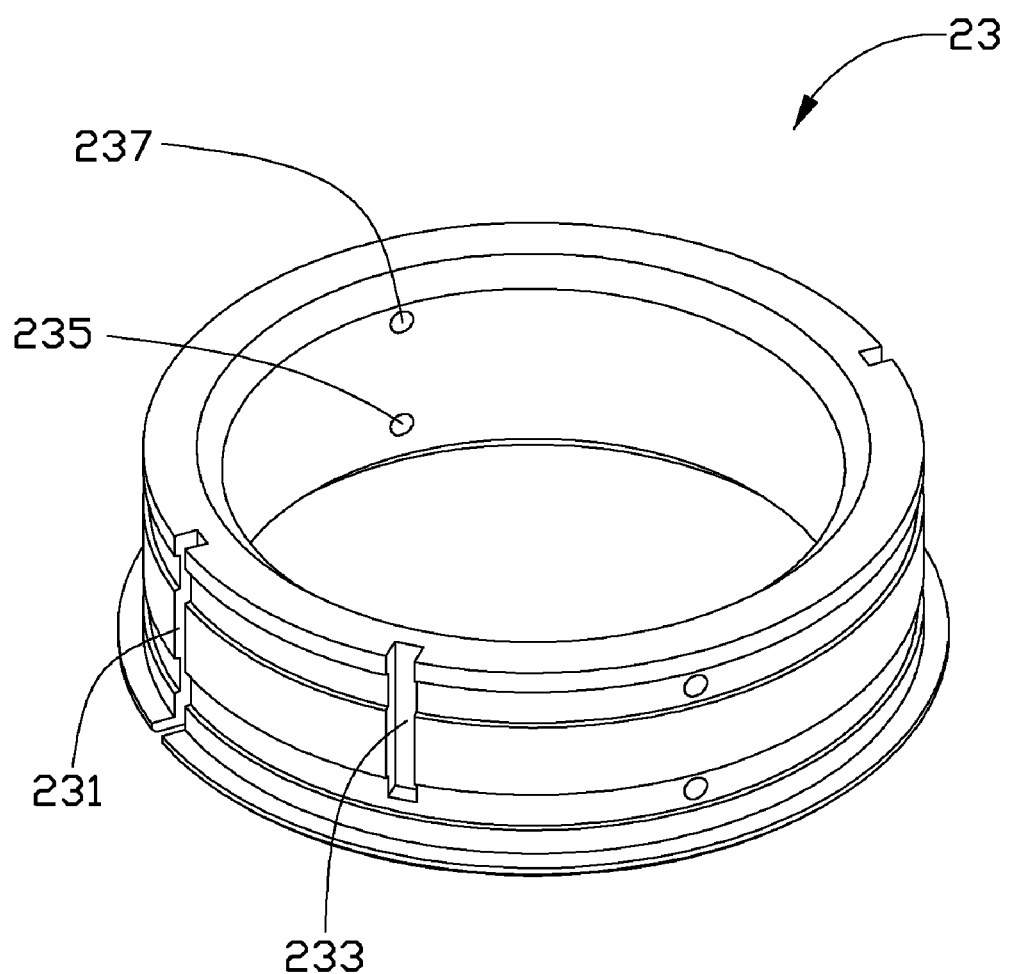
FIG. 3 an isometric view of the fixing member shown in FIG. 2.

Referring to FIGS. 1 through 3, an exemplary embodiment of an adjustable connecting mechanism 100 for a camera device includes a frame 21, a fixing member 23 and a locking screw 25. In the illustrated embodiment, the frame 21 is a front cover mounted on a body of the camera device.

The frame 21 includes a main body 211 and a mounting portion 213. The main body 211 defines an aperture 2111. The mounting portion 213 is a substantially cylindrical barrel, extending perpendicularly from an outer surface of the main body 211, and surrounding the aperture 2111. The mounting portion 213 forms a pair of positioning strips 2131 and an adjusting portion 2135 on an inner surface thereof. The adjusting portion 2135 is about 5 mm in length, and extends from the outer surface of the main body 211 along an axis of the mounting portion 213. Each positioning strip 2131 extends from one end to the other end of the mounting portion 213, along the axis thereof. The mounting portion 213 further defines two through holes 2133 facing and opposite to each other. Each through hole 2133 is equidistantly spaced between the two positioning strips 2131 along the circumference of an inner surface of the mounting portion 213.

The fixing member 23 is used for mounting a first camera module or a second camera module (not shown). The fixing member 23 is substantially a hollow cylinder, and forms a flange 230 substantially around an outer edge thereof. An outer diameter of the flange 230 is substantially equal to an inner diameter of the mounting portion 213. The fixing member 23 defines a pair of positioning slots 231 for receiving the pair of positioning strips 2131 and a receiving slot 233 for receiving the adjusting portion 2135. The fixing member 23 defines a first engaging portion 235 and a second engaging portion 237 corresponding to each through hole 2133. The first engaging portion 235 is adjacent to the flange 230, and the second engaging portion 237 is spaced from the flange 230. A distance between a center of the first engaging portion 235 and a center of the second portion 237 is about 5 mm. In the illustrated embodiment, the number of adjusting portions 2135 is only one, the first engaging portion 235 is a circular threaded hole, the second engaging portion 237 is the same as the first engaging portion 235. An imaginary line passing through the center of the first engaging portion 235 and the center of second engaging portion 237 is parallel to the axis of the mounting portion 213. In alternative embodiments, the center of the first engaging portion 235 and the center of second engaging portion 237 may not be in a line parallel to the axis of the mounting portion 213. However, the distance between the center of the first engaging portion 235 and the center of the second engaging portion 237 along the axis of the mounting portion 213 is still 5 mm. The number of the adjusting portions 2135 may be two or more, and these adjusting portions 2135 are asymmetrically distributed on an inner surface relative to a center of the mounting portion 213.

The locking screw 25 includes a threaded portion 251 and a head portion 253 at a distal end of the threaded portion 253.

If the second camera module is needed, and a user may assemble the adjustable connecting mechanism 100 in CS-type. The fixing member 23 is mounted in the mounting portion 213, each positioning strip 2131 is received in a receiving slot 231, and the adjusting portion 2135 abuts an end of the fixing member 23 away from the flange 230. The through hole 2133 of the mounting portion 213 is aligned to the second engaging portion 237. The threaded portion 251 of the locking screw 25 passes through the through hole 2133 and engages in the second engaging portion 237. The head portion 235 resists the fixing member 23, to fix on the mounting portion 213. Then the second camera module is mounted on the fixing member 23. The distance between the lens of the camera module and the film in the main body is about 17.5 mm, this is CS-type mount; and the second camera module is capable imaging at the film in the main body.

Figure 4:
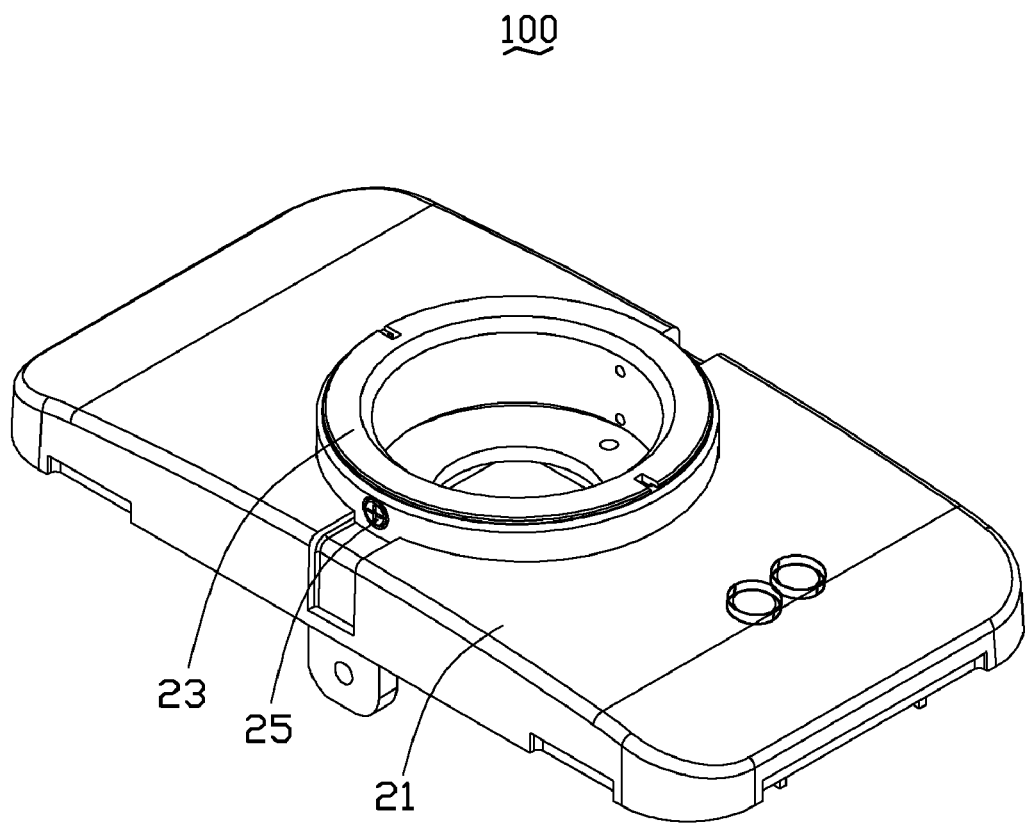
FIG. 4 is an isometric view of the adjustable connecting mechanism shown in FIG. 2 in a state of CS-type mount.

Referring to the FIG. 4, if the first camera module is needed, the user may remove the second camera module from the fixing member 23, and remove the locking screw 25 to disassemble the first the fixing member 23 and the frame 21. The fixing member 23 is rotated 180 degrees around an axis, and then remounted in the mounting portion 213. Each positioning strip 2131 is received in a positioning slot 231, and the adjusting portion 2135 is received in the receiving slot 233. The through hole 2133 is aligned to the first engaging portion 235. The locking screw 25 passes through the through hole 2133 and engages in the first engaging portion 235, to fix the fixing member 23 on the mounting portion 213. Then, the second camera module is mounted on the fixing member 23. Since the adjusting portion 2135 is received in the receiving hole 233, the first camera module is 5 mm lower than the second camera module in C-type mount, and also capable of imaging at the film in the main body.

The adjustable connecting mechanism 100 includes a fixing member 23, the fixing member 23 defines the first engaging portion 235 and the second engaging portion 237 for mounting the fixing member, and a distance between the first and second engaging portions 235 and 237 along the axis of the fixing member 23 is 5 mm. The locking screw 25 is capable of engaging in the first engaging portion 235 or the second engaging portion 237, thus a height of the fixing member 23 relative to the frame 21 can be adjusted, and the mount type of the adjustable connecting mechanism 100 can be easily switched. When the adjusting portion 2135 is received in the receiving slot 233, the fixing member 23 contacts the frame 211; this is CS-type mount. The adjustable connecting mechanism 100 can be adjusted when the adjusting portion 2135 deviates from the receiving slot 233, the adjusting portion 2135 abuts the fixing member 23, thus the fixing member 23 is raised 5 mm in height and switch to the C-type mount.

Finally, while particular embodiments have been described, the description is illustrative and is not to be construed as limiting. For example, various modifications can be made to the embodiments by those of ordinary skill in the art without departing from the true spirit and the scope of the invention as defined by the appended claims.

What is claimed is:

1. An adjustable connecting mechanism for a camera device, the adjustable connecting mechanism comprising:
   a frame comprising a mounting portion, the mounting portion defining a through hole;
   a fixing member, the fixing member being a substantially cylindrical barrel and defining a first engaging portion and a second engaging portion spaced a predetermined distance along an axis of the fixing member from the first engaging portion, and
   a locking screw, the locking screw for passing through the through hole and selectively engaging in the first engaging portion or the second engaging portion, to adjust a height of the fixing member relative to the frame;
   wherein the mounting portion is a substantially cylindrical barrel; the first engaging portion and the second engaging portion are circular holes; an imagery line passing a center of the first engaging portion and a center of the second engaging portion is parallel to the axis of the mounting portion.

2. The adjustable connecting mechanism of claim 1, wherein the mounting portion forms an adjusting portion thereon, the fixing member defines a receiving slot for receiving the adjusting portion; a length of the adjusting portion is substantially equal to the predetermined distance between the first engaging portion and the second engaging portion along the axis of the fixing member.

3. The adjustable connecting mechanism of claim 2, wherein there are at least two adjusting portions, the at least two adjusting portions asymmetrically distributed on an inner surface of the mounting portion relative to a center of the mounting portion.

4. The adjustable connecting mechanism of claim 1, wherein the mounting portion further comprises a pair of positioning strips facing each other, each mounting portion is at a side of the through hole, the fixing member defines a pair of positioning slots corresponding to the pair of positioning strips.

5. The adjustable connecting mechanism of claim 1, wherein the locking screw is a screw, the first and the second engaging portions are threaded holes for receiving the locking screw.

6. The adjustable connecting mechanism of claim 1, wherein the predetermined distance is 5 millimeters.

7. An adjustable connecting mechanism for a camera device, the adjustable connecting mechanism comprising:
   a frame, the frame forming a mounting portion, the mounting portion being a cylindrical barrel defining a through hole in a side surface thereon, and forming an adjusting portion on an inner surface thereof;
   a fixing member, the fixing member being cylindrical barrel and defining a first engaging portion, a second engaging portion spaced a predetermined distance along an axis of the fixing member from the first engaging portion and a receiving slot for receiving the adjusting portion of the mounting portion; and
   a locking screw, the locking screw for passing through the through hole and selectively engaging in the first engaging portion or the second engaging portion, to adjust a height of the fixing member relative to the frame.

8. The adjustable connecting mechanism of claim 7, wherein the predetermined distance is 5 millimeters.

9. The adjustable connecting mechanism of claim 8, wherein a length of the adjusting portion is 5 millimeters.

10. The adjustable connecting mechanism of claim 7, wherein the first engaging portion and the second engaging portion are circular holes, an imagery line passing a center of the first engaging portion and a center of the second engaging portion is parallel to the axis of the mounting portion.

11. The adjustable connecting mechanism of claim 7, wherein there are at least two adjusting portions, the at least two adjusting portions asymmetrically distributed on an inner surface of the mounting portion relative to a center of the mounting portion.

12. The adjustable connecting mechanism of claim 7, wherein the mounting portion further comprises a pair of positioning strips facing to each other, each mounting portion is at a side of the through hole, the fixing member defines a pair of positioning slots corresponding to the pair of positioning strips.

13. The adjustable connecting mechanism of claim 7, wherein the locking screw is a screw, the first and the second engaging portions are threaded holes for receiving the locking screw.

* * * * *